US012357954B2

(12) United States Patent
Wu et al.

(10) Patent No.: US 12,357,954 B2
(45) Date of Patent: Jul. 15, 2025

(54) MIXING AND DISPERSING APPARATUS

(71) Applicant: CONTEMPORARY AMPEREX TECHNOLOGY (HONG KONG) LIMITED, Hong Kong (CN)

(72) Inventors: Liangliang Wu, Ningde (CN); Liang Jiang, Ningde (CN); Qingxuan Lei, Ningde (CN)

(73) Assignee: CONTEMPORARY AMPEREX TECHNOLOGY (HONG KONG) LIMITED, Hong Kong (CN)

(*) Notice: Subject to any disclaimer, the term of this patent is extended or adjusted under 35 U.S.C. 154(b) by 0 days.

(21) Appl. No.: 18/486,937

(22) Filed: Oct. 13, 2023

(65) Prior Publication Data

US 2024/0033697 A1 Feb. 1, 2024

Related U.S. Application Data

(63) Continuation of application No. 18/191,324, filed on Mar. 28, 2023, now Pat. No. 11,819,812, which is a (Continued)

(30) Foreign Application Priority Data

Jun. 8, 2022 (CN) ........................ 202221405080.5

(51) Int. Cl.
*B01F 27/232* (2022.01)
*B01F 27/116* (2022.01)
(Continued)

(52) U.S. Cl.
CPC ........ *B01F 27/2324* (2022.01); *B01F 27/116* (2022.01); *B01F 27/191* (2022.01);
(Continued)

(58) Field of Classification Search
CPC ..... B01F 27/941; B01F 27/95; B01F 27/2324
(Continued)

(56) References Cited

U.S. PATENT DOCUMENTS 26,880 A * 1/1860 Brown ................ B01F 27/2711 366/304
388,740 A * 8/1888 Stockdale ................ A23G 9/12 366/328.3
(Continued)

FOREIGN PATENT DOCUMENTS

CN 1990097 B 12/2010
CN 105170293 A 12/2015
(Continued)

OTHER PUBLICATIONS

International Search Report for Application No. PCT/CN2022/104086, mailed Dec. 21, 2022, 6 pages.
(Continued)

*Primary Examiner* — David L Sorkin
(74) *Attorney, Agent, or Firm* — Ladas & Parry LLP

(57) ABSTRACT

A mixing and dispersing apparatus includes a tank body, a stirring part, a dispersing part, and a driving part. The tank body has an accommodating cavity configured to accommodate materials. The stirring part is disposed in the accommodating cavity and configured to mix the materials in the accommodating cavity. The dispersing part is disposed in the accommodating cavity and includes a first cylinder and a second cylinder. The first cylinder has a first cavity in communication with the accommodating cavity, the second cylinder is located in the first cavity, and the second cylinder has a second cavity in communication with the accommodating cavity. The driving part is connected to the stirring part and the dispersing part. The materials mixed in the
(Continued)

accommodating cavity flow into the second cavity and flow out after being dispersed in the dispersing part.

14 Claims, 4 Drawing Sheets

Related U.S. Application Data continuation of application No. PCT/CN2022/104086, filed on Jul. 6, 2022.

(51) Int. Cl.

| | |
|---|---|
| ***B01F 27/191*** | (2022.01) |
| ***B01F 27/94*** | (2022.01) |
| ***B01F 27/95*** | (2022.01) |

(52) U.S. Cl.

CPC ............ *B01F 27/941* (2022.01); *B01F 27/95* (2022.01); *B01F 2215/0422* (2013.01); *B01F 2215/0431* (2013.01)

(58) Field of Classification Search

USPC ................. 366/245, 264, 299, 304–306, 288

See application file for complete search history.

(56) References Cited

U.S. PATENT DOCUMENTS

| | | | | |
|---|---|---|---|---|
| 2,627,394 | A * | 2/1953 | Spencer | B01F 23/2351 366/76.1 |
| 3,194,540 | A * | 7/1965 | Hager | B01F 27/2711 241/86 |
| 5,931,529 | A * | 8/1999 | LaPointe | A47C 13/005 403/319 |
| 2013/0189311 | A1 | 7/2013 | Rueckl et al. | |
| 2021/0339210 | A1 | 11/2021 | Lee et al. | |

FOREIGN PATENT DOCUMENTS

| | | | |
|---|---|---|---|
| CN | 107233980 | A | 10/2017 |
| CN | 108568238 | A | 9/2018 |
| CN | 108654493 | A | 10/2018 |
| CN | 208583282 | U | 3/2019 |
| CN | 210994019 | U | 7/2020 |
| CN | 215822815 | U | 2/2022 |
| CN | 215996473 | U | 3/2022 |
| CN | 216223858 | U | 4/2022 |
| EP | 0290033 | A1 | 11/1988 |

OTHER PUBLICATIONS

Partial Supplementary European Search Report for EP application No. 22871043.0, dated Apr. 3, 2024.

* cited by examiner

MIXING AND DISPERSING APPARATUS

CROSS-REFERENCE TO RELATED APPLICATIONS

This application is a continuation of U.S. patent application Ser. No. 18/191,324, filed on Mar. 28, 2023, which is a continuation of International Patent Application No. PCT/CN2022/104086, filed on Jul. 6, 2022. The International Patent Application claims priority to Chinese Patent Application No. 202221405080.5, filed on Jun. 8, 2022. The aforementioned patent applications are incorporated herein by reference in their entirety.

TECHNICAL FIELD

This application relates to the technical field of mixing and dispersing devices, and specifically to a mixing and dispersing apparatus.

BACKGROUND

When two or more types of materials are to be mixed or dispersed, a mixing and dispersing apparatus is often required for dispersing the materials so as to obtain a mixture with desirable uniformity, and such mixture with desirable uniformity is crucial to the quality of products prepared from it.

However, in related technologies, mixing and dispersing apparatuses disperse materials by stirring, resulting in a long dispersion time and low dispersion efficiency.

SUMMARY

This application provides a mixing and dispersing apparatus, which can shorten material dispersion time and improve material dispersion efficiency.

This application provides a mixing and dispersing apparatus including a tank body, a stirring part, a dispersing part, and a driving part. The tank body has an accommodating cavity configured to accommodate materials. The stirring part is disposed in the accommodating cavity and configured to mix the materials in the accommodating cavity. The dispersing part is disposed in the accommodating cavity and includes a first cylinder and a second cylinder, where the first cylinder has a first cavity in communication with the accommodating cavity, the second cylinder is located in the first cavity, and the second cylinder has a second cavity in communication with the accommodating cavity. The driving part is connected to the stirring part, so as to drive the stirring part to mix the materials in the accommodating cavity. The driving part is also connected to the dispersing part, so as to drive the second cylinder to rotate in the first cavity with respect to the first cylinder, such that the materials mixed in the accommodating cavity flow into the second cavity and flow out after being dispersed in the dispersing part.

In the foregoing embodiments, the stirring part can be driven by the driving part to mix the materials in the accommodating cavity by stirring. During mixing of the materials, the second cylinder in the dispersing part can be driven by the driving part to rotate in the first cavity with respect to the first cylinder, and such rotation allows the second cavity to have an internal pressure lower than an external pressure. In this case, the materials in the accommodating cavity will flow into the second cavity and will be thrown out of the second cavity under the rotation of the second cylinder. The materials thrown out will be subjected to a large shearing force between the first cylinder and the second cylinder, and the first cylinder and the second cylinder can increase a shearing area of the materials, accelerating the dispersion of the materials, thus shortening the material dispersion time and improving the material dispersion efficiency.

In some embodiments of this application, an inner radius of the first cylinder is 10 mm to 15 mm larger than an outer radius of the second cylinder.

In the foregoing embodiments, the shearing force experienced by the materials entering the gap between the first cylinder and the second cylinder can be increased, and the increase of the shearing force will further accelerate crushing and dispersion of the materials, thereby shortening the material dispersion time and improving the dispersion efficiency.

In some embodiments of this application, a plurality of shearing teeth are spaced apart along a circumferential direction on a side wall of the first cylinder, a first flow-out channel is formed between adjacent two of the first shearing teeth, and the first flow-out channel is located between and in communication with the first cavity and the accommodating cavity. A plurality of second shearing teeth are spaced apart along a circumferential direction on a side wall of the second cylinder, a second flow-out channel is formed between adjacent two of the second shearing teeth, and the second flow-out channel is located between and in communication with the first cavity and the second cavity.

In the foregoing embodiments, the materials can be made to collide with wall surfaces of the first sheering teeth and the second shearing teeth, so as to crush and disperse the materials, thereby further improving the material dispersion efficiency.

In some embodiments of this application, width of the first flow-out channel is smaller than or equal to width of the second flow-out channel.

In the foregoing embodiments, the width of the first flow-out channel being smaller than the width of the second flow-out channel not only allows the materials to flow into the gap between the first cylinder and the second cylinder at a high speed so that the materials are sheared, but also allows the sheared materials to enter the narrower first flow-out channel so that the materials are sheared again, thereby further improving the material dispersion efficiency.

In some embodiments of this application, the first flow-out channel has a width of 2 mm to 5 mm, and the second flow-out channel has a width of 3 mm to 8 mm.

In the foregoing embodiments, the width settings of the first flow-out channel and the second flow-out channel can not only increase the amount of materials flowing into the gap between the first cylinder and the second cylinder, but also improve the material dispersion efficiency.

In some embodiments of this application, the first flow-out channel is inclined with respect to a radial direction of the first cylinder. The second flow-out channel is inclined with respect to a radial direction of the second cylinder.

In the foregoing embodiments, the first flow-out channel and the second flow-out channel being inclined can enhance collision between the materials and the wall surfaces of the channels, so as to accelerate dispersion of the materials, thereby improving the dispersion efficiency.

In some embodiments of this application, a cross section of the first shearing tooth is an inclined rectangle. A cross section of the second shearing tooth is an inclined rectangle.

In the foregoing embodiments, the inclined rectangles facilitate rapid flow of the materials into the channels, thereby shortening the dispersion time.

In some embodiments of this application, an inclination angle of the first shearing tooth is 30° to 45°. An inclination angle of the second shearing tooth is 30° to 60°.

In the foregoing embodiments, the angle settings of the first shearing tooth and the second shearing tooth can accelerate flow of the materials into the flow-out channels and also helps the crushing of the materials.

In some embodiments of this application, the cross sections of the first shearing tooth and the second shearing tooth are inclined in opposite directions.

In the foregoing embodiments, a possibility of collision between the wall surface of the first cylinder and the materials flowing out of the second cylinder can be increased, thus helping the crushing and dispersion of the materials.

In some embodiments of this application, the second cylinder includes a second cylinder body, a transmission member, and a plurality of support members. The second cylinder body has a second cavity. The transmission member is disposed in the second cavity and connected to the driving part. The support members are connected between the second cylinder body and the transmission member such that the driving part drives the transmission member to drive the second cylinder body to rotate, a feeding channel of the second cylinder body is formed between adjacent two of the support members, and the feeding channel is in communication with the second cavity.

In the foregoing embodiments, the support members are connected between the second cylinder body and the transmission member to provide fixed connection and support, thus facilitating stable rotation of the second cylinder. In addition, the feeding channel formed between the adjacent support members can enhance flow of the materials in an axial direction of the second cylinder, so as to increase a possibility of being sheared, thereby shortening the material dispersion time and improving the material dispersion efficiency.

In some embodiments of this application, the support member includes a guide surface, and the guide surface is inclined toward the second cavity.

In the foregoing embodiments, the guide surface can accelerate flow of the materials into the second cavity and enhance the flow of the materials along the axial direction, thereby increasing the possibility of the materials being sheared, further shortening the material dispersion time and improve the material dispersion efficiency.

In some embodiments of this application, an inclination angle of the guide surface is 30° to 60°.

In the foregoing embodiments, the inclination angle setting of the guide surface allows the materials to be guided to flow rapidly into the second cavity and flow at a high speed along the axial direction of the second cylinder, so that the materials collide with each other and flow out at a high speed, thus enhancing the crushing and dispersion of the materials.

In some embodiments of this application, the driving part includes a first traction source, a second traction source, and a planetary gearbox. The first traction source is configured to provide traction for driving the second cylinder to rotate. The second traction source is configured to provide traction for driving the stirring part to rotate. An input end of the planetary gearbox is connected to both the first traction source and the second traction source, and an output end of the planetary gearbox is connected to both the dispersing part and the stirring part.

In the foregoing embodiments, the first traction source may provide traction for driving the second cylinder to rotate at a high speed, such that the materials flowing into the dispersing part are sheared, improving material dispersion efficiency. The second traction source drives, via the planetary gearbox, the stirring part to rotate, and the stirring part can spin when revolving, so that the materials are able to flow along the axial direction and the circumferential direction, shortening the material mixing time.

In some embodiments of this application, the mixing and dispersing apparatus further includes a turnplate, where the turnplate is disposed in the tank body and in transmission connection with the output end of the planetary gearbox. The first cylinder includes a first cylinder body and a connecting shaft that is connected to an end portion of the first cylinder body, where the connecting shaft is also connected to the turnplate.

In the foregoing embodiments, the second traction source drives the turnplate to drive the first cylinder to rotate, so that collision between the materials and the first cylinder can be enhanced, accelerating the crushing and dispersion of the materials, further shortening the material dispersion time and improving the material dispersion efficiency.

The foregoing descriptions are merely a summary of the embodiments of this application. For a clearer understanding of the technical means of this application such that they can be practiced according to the content of the specification, and to make the foregoing and other objectives, features and benefits of this application more apparent and easier to understand, the following specially illustrates specific embodiments of this application.

BRIEF DESCRIPTION OF DRAWINGS

To describe the embodiments of this disclosure more clearly, the following briefly introduces the accompanying drawings required for describing the embodiments of this application. Apparently, the accompanying drawings in the following description show merely some embodiments of this application, and persons of ordinary skill in the art may still derive other drawings from the accompanying drawings without creative efforts.

Figure 1:
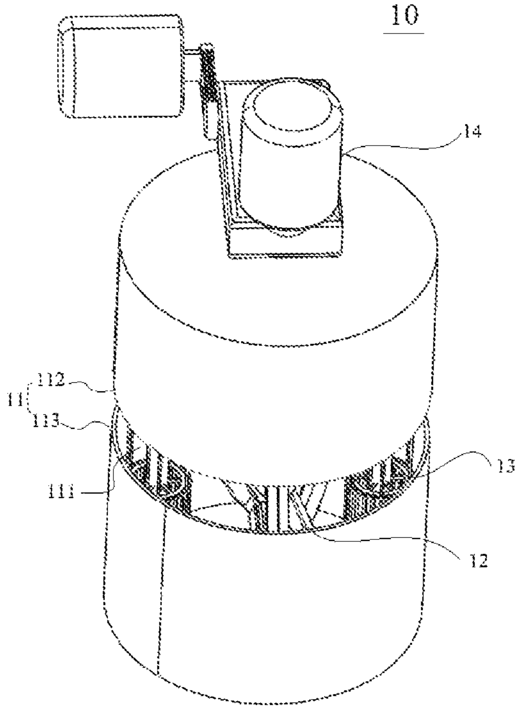
FIG. 1 is a schematic structural diagram of a mixing and dispersing apparatus according to some embodiments of this application.

REFERENCE SIGNS IN THE SPECIFIC EMBODIMENTS ARE AS FOLLOWS mixing and dispersing apparatus 10;
tank body 11;

accommodating cavity 111;
first tank body 112;
second tank body 113;
stirring part 12;
first stirring paddle 121;
second stirring paddle 122;
dispersing part 13;
first cylinder 131;
first cylinder body 1311;
first cavity 1311*a;*
first shearing tooth 1311*b;*
first flow-out channel 1311*c;*
connecting shaft 1312;
second cylinder 132;
second cylinder body 1321;
second cavity 1321*a;*
second shearing tooth 1321*b;*
second flow-out channel 1321*c;*
transmission member 1322;
support member 1323;
driving part 14;
first traction source 141;
second traction source 142;
planetary gearbox 143;
speed reducer 1431;
center shaft 1432;
sun shaft 1433;
sun gear 1434;
planet shaft 1435;
planet gear 1436; and
turnplate 15.

DETAILED DESCRIPTION

The following further describes embodiments of this application in detail with reference to the accompanying drawings and embodiments. The following detailed description of embodiments and the accompanying drawings are used to illustrate the principle of this application, but cannot be used to limit the scope of this application, that is, meaning this application is not limited to the embodiments described.

In the descriptions of this application, it should be noted that, unless otherwise stated, “plurality” means two or more. The orientations or positional relationships indicated by the terms “upper”, “lower”, “left”, “right”, “inside”, “outside”, and the like are merely for ease and brevity of descriptions of this application rather than for indicating or implying that the apparatuses or components mentioned must have specific orientations or must be constructed and manipulated at specific orientations, and therefore shall not be construed as limitations on this application. In addition, the terms “first”, “second”, and “third” are merely intended for a purpose of description, and shall not be understood as any indication or implication of relative importance. “Vertical” means being vertical with an allowable range of error rather than being vertical in strict sense. “Parallel” means being parallel with an allowable range of error rather than being parallel in strict sense.

The orientation terms appearing in the following description are all directions as shown in the drawings, and do not limit the specific structures in the application. In the descriptions of this application, it should be further noted that unless otherwise specified and defined explicitly, the terms “mount”, “connect”, and “join” should be understood in their general senses. For example, they may refer to a fixed connection, a detachable connection, or an integral connection, and may refer to a direct connection or an indirect connection through an intermediate medium. Persons of ordinary skill in the art can understand specific meanings of these terms in this application as appropriate to specific situations.

A mixture with desirable uniformity is crucial to the quality of products prepared from it. For example, in a battery, an electrode plate of an electrode assembly needs to be coated with a slurry containing an active material, a binder, a conductive agent, and a solvent. Such slurry is often made with desirable uniformity by dispersing the materials thereof using a mixing and dispersing apparatus. After applied onto the electrode plate, such slurry with desirable uniformity helps improvement of electrochemical performance of the battery.

However, in related technologies, mixing and dispersing apparatuses disperse materials by stirring. The inventors have found that when used to mix and disperse powder, high-viscosity, and high-density materials, especially materials in a slurry for batteries, existing mixing and dispersing apparatuses often need a long time to disperse the materials, resulting in low dispersion efficiency.

In view of this, this application provides a mixing and dispersing apparatus. The apparatus includes a tank body, a stirring part, a dispersing part, and a driving part. The tank body has an accommodating cavity configured to accommodate materials. The stirring part is disposed in the accommodating cavity and configured to mix the materials in the accommodating cavity. The dispersing part is disposed in the accommodating cavity and includes a first cylinder and a second cylinder, where the first cylinder has a first cavity in communication with the accommodating cavity, the second cylinder is located in the first cavity, and the second cylinder has a second cavity in communication with the accommodating cavity. The driving part is connected to the stirring part, so as to drive the stirring part to mix the materials in the accommodating cavity. The driving part is also connected to the dispersing part, so as to drive the second cylinder to rotate in the first cavity with respect to the first cylinder, such that the materials mixed in the accommodating cavity flow into the second cavity and flow out after being dispersed in the dispersing part.

The battery mentioned in the embodiments of this application is a single physical module that includes one or more battery cells for providing a higher voltage and capacity. For example, the battery mentioned in this application may include a battery module, a battery pack, or the like. A battery typically includes a box configured to enclose one or more battery cells. The box can prevent liquids or other foreign matters from affecting charging or discharging of the battery cells.

In some embodiments of this application, the battery cell may include a lithium-ion battery cell, a lithium-sulfur battery cell, a sodium-ion battery cell, a magnesium-ion battery cell, or the like, and may be a primary battery or a secondary battery. This is not limited in the embodiments of this application. The battery cell may be cylindrical, flat, cuboid, or of other shapes, which is not limited in the embodiments of this application either.

The battery cell includes an electrode assembly and an electrolyte. The electrode assembly includes a positive electrode plate, a negative electrode plate, and a separator. Working of the battery cell mainly relies on migration of metal ions between the positive electrode plate and the negative electrode plate. The positive electrode plate includes a positive electrode current collector and a positive electrode active material layer. The positive electrode active material layer is applied on a surface of the positive electrode current collector. The negative electrode plate includes a negative electrode current collector and a negative electrode active material layer. The negative electrode active material layer is applied on a surface of the negative electrode active current collector. In this application, slurry for forming the positive electrode active material layer and the negative electrode active material layer may be prepared using the mixing and dispersing apparatus in this application.

Specifically, the active material, conductive agent, binder, solvent, and other additives are added into the accommodating cavity of the tank body, and are stirred by the stirring part, such that components of the slurry are mixed. In the mixing process, the components can be sucked into the dispersing part to be mixed and dispersed, and after the dispersion, the resultant mixture can enter the accommodating cavity again.

Refer to FIG. 1 to FIG. 7. A mixing and dispersing apparatus 10 provided by embodiments of this application includes a tank body 11, a stirring part 12, a dispersing part 13, and a driving part 14. The tank body 11 has an accommodating cavity 111 configured to accommodate materials. The stirring part 12 is disposed in the accommodating cavity 111 and configured to mix the materials in the accommodating cavity 111. The dispersing part 13 is disposed in the accommodating cavity 111 and includes a first cylinder 131 and a second cylinder 132. The first cylinder 131 has a first cavity 1311*a* in communication with the accommodating cavity 111, the second cylinder 132 is located in the first cavity 1311*a*, and the second cylinder 132 has a second cavity 1321*a* in communication with the accommodating cavity 111. The driving part 14 is connected to the stirring part 12, so as to drive the stirring part 12 to mix the materials in the accommodating cavity 111. The driving part 14 is also connected to the dispersing part 13, so as to drive the second cylinder 132 to rotate in the first cavity 1311*a* with respect to the first cylinder 131, such that the materials mixed in the accommodating cavity 111 flow into the second cavity 1321*a* and flow out after being dispersed in the dispersing part 13.

The tank body 11 may be made of any material commonly known in the art, for example, metal or plastic. For example, the tank body 11 may be made of copper. In addition, volume of the tank body 11 may be determined according to volume of the materials. For example, when the volume of the materials is 50 L, the volume of the tank body 11 may be 70 L, 80 L, or the like.

The stirring part 12 is disposed in the accommodating cavity 111 and can be driven by the driving part 14 to mix the materials in the accommodating cavity 111. In addition, stirring velocity of the stirring part 12 can be controlled by the driving part 14, and the specific stirring velocity can be adjusted based on physical properties and volume of the materials.

The dispersing part 13 is disposed in the accommodating cavity 111 and can be driven by the driving part 14 to mix the materials in the accommodating cavity 111. The dispersing part 13 includes a first cylinder 131 and a second cylinder 132, where cylinder structures of the first cylinder 131 and the second cylinder 132 can provide enough space in which a large amount of materials can be subjected to a large shearing force, thus accelerating the crushing and dispersion of the materials.

The driving part 14 may be disposed inside the tank body 11 or outside the tank body 11. This is not specifically limited in this application. For example, the driving part 14 is disposed inside the tank body 11, and an output end of the driving part 14 is connected to both the stirring part 12 and the second cylinder 132.

In the foregoing embodiments, the stirring part 12 can be driven by the driving part 14 to mix the materials in the accommodating cavity 111 by stirring. During mixing of the materials, the second cylinder 132 in the dispersing part 13 can be driven by the driving part 14 to rotate in the first cavity 1311*a* with respect to the first cylinder 131, and such rotation allows the second cavity 1321*a* to have an internal pressure lower than an external pressure. In this case, the materials in the accommodating cavity 111 will flow into the second cavity 1321*a* and will be thrown out of the second cavity 1321*a* under the rotation of the second cylinder 132. The materials thrown out will be subjected to a large shearing force in the first cylinder 131 and the second cylinder 132. The cylinder structures of the first cylinder 131 and the second cylinder 132 can increase a shearing area of the materials, accelerating the dispersion of the materials, thus shortening the material dispersion time and improving the material dispersion efficiency.

Figure 2:
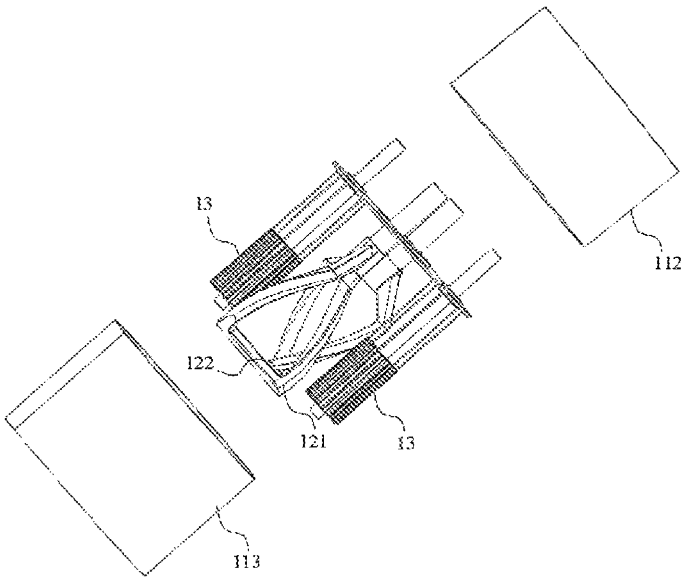
FIG. 2 is an exploded view of the mixing and dispersing apparatus in FIG. 1 with a driving part hidden.

Refer to FIG. 1 and FIG. 2. In some embodiments of this application, the tank body 11 may include a first tank body 112 and a second tank body 113. The first tank body 112 may cover the second tank body 113 to produce the accommodating cavity 111 for accommodating materials, and the stirring part 12 and the dispersing part 13 may be accommodated in the accommodating cavity 111.

In the embodiments of this application, the stirring part 12 is disposed in the accommodating cavity 111 and can rotate in the accommodating cavity 111 under the driving of the driving part 14 so as to mix the materials in the accommodating cavity 111, such that the materials are mixed to uniformity.

Refer to FIG. 2. In some embodiments of this application, the stirring part 12 includes a first stirring paddle 121 and a second stirring paddle 122, where the first stirring paddle 121 and the second stirring paddle 122 are both connected to the driving part 14. The first stirring paddle 121 and the second stirring paddle 122 rotate in the accommodating cavity 111, shortening a material mixing time.

For example, the first paddle 121 and the second stirring paddle 122 may be frame-type twist stirring paddles, meaning the stirring paddle includes a plurality of blades which can spin while revolving, under the driving of the driving part 14. In this way, the materials can flow in both the axial direction and the circumferential direction so as to be mixed to uniformity within a short time.

In the embodiments of this application, the first cylinder 131 may be construed as a stator, and the second cylinder 132 may be construed as a rotor, where the cylinder structures of the stator and the rotor can provide a large shearing area for shearing the materials. The second cylinder 132 can rotate with respect to the first cylinder 131 under the driving of the driving part 14. In this way, the materials stirred and mixed by the stirring part 12 can be sucked into the second cavity 1321*a* along an axial direction. The materials sucked in are subjected to a large shearing force in the first cylinder 131 and the second cylinder 132, and the large shearing force can accelerate the crushing and dispersion of the materials.

In some embodiments of this application, an inner radius of the first cylinder 131 is 10 mm to 15 mm larger than an outer radius of the second cylinder 132. It can be understood that radius of an inner circle of the first cylinder 131 being 10 mm to 15 mm larger than radius of an outer circle of the second cylinder 132 means the gap between the first cylinder 131 and the second cylinder 132 being in a range from 10 mm to 15 mm. In this gap, the materials are compressed and collide with each other, increasing the shearing force experienced by the materials, further accelerating the crushing and dispersion of the materials, thus shortening the material dispersion time and improving the material dispersion efficiency.

For example, the inner radius of the first cylinder 131 may be 10 mm, 11 mm, 12 mm, 13 mm, 14 mm, or 15 mm larger than the outer radius of the second cylinder 132.

Figure 3:
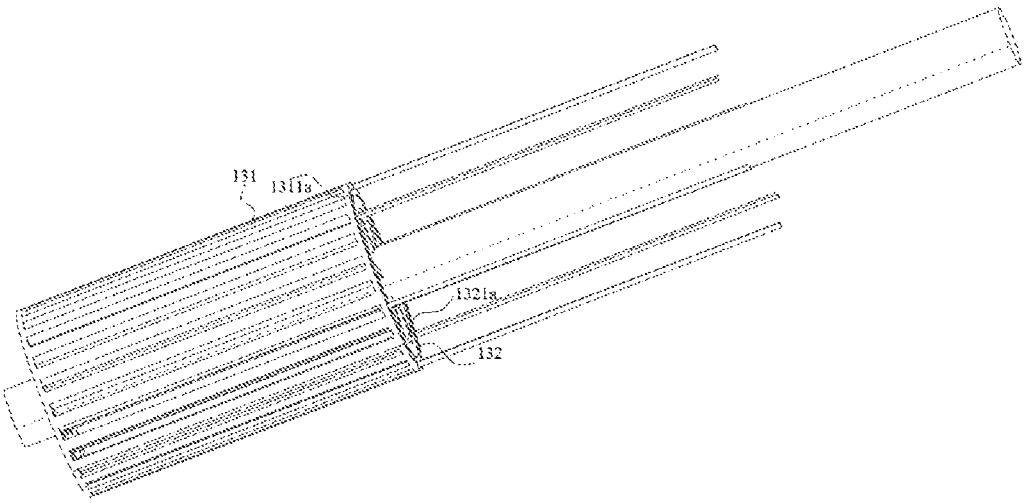
FIG. 3 is a schematic structural diagram of a dispersing part in a mixing and dispersing apparatus according to some embodiments of this application.
Figure 4:
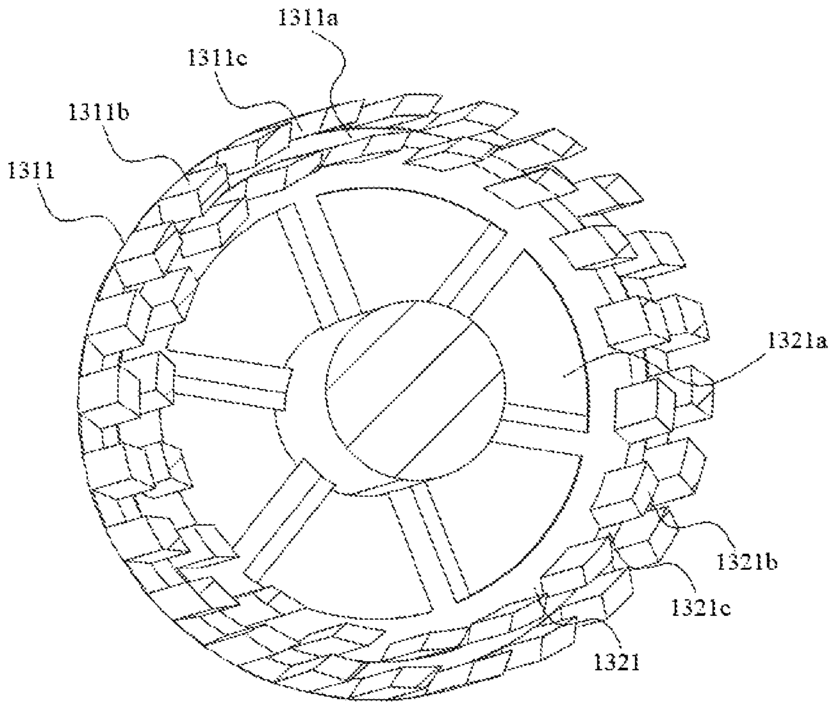
FIG. 4 is a cross-sectional view of a dispersing part according to some embodiments of this application.

Refer to FIG. 3 and FIG. 4. In some embodiments of this application, a plurality of shearing teeth 1311*b* are spaced apart along a circumferential direction on a side wall of the first cylinder 131. A first flow-out channel 1311*c* is formed between adjacent two of the first shearing teeth 1311*b*, and the first flow-out channel 1311*c* is located between and in communication with the first cavity 1311*a* and the accommodating cavity 111. A plurality of second shearing teeth 1321*b* are spaced apart along a circumferential direction on a side wall of the second cylinder 132. A second flow-out channel 1321*c* is formed between adjacent two of the second shearing teeth 1321*b*, and the second flow-out channel 1321*c* is located between and in communication with the first cavity 1311*a* and the second cavity 1321*a*.

In the foregoing embodiments, the first flow-out channel 1311*c* runs through the side wall of the first cylinder 131 along a thickness direction of the first cylinder 131, so as to communicate with the first cavity 1311*a* and the accommodating cavity 111. The second flow-out channel 1321*c* runs through the side wall of the second cylinder 132 along a thickness direction of the second cylinder 132, so as to communicate with the first cavity 1311*a* and the second cavity 1321*a*. The materials flow into the second cavity 1321*a* and rotate following the second cylinder 132. Under the action of a centrifugal force, the materials are thrown out along a radial direction of the second cylinder 132. While being thrown out, mutual friction and collision happen between the materials, helping the crushing and dispersion of the materials. The materials thrown out reach and collide with wall surfaces of the second shearing teeth 1321*b*, further helping the crushing and dispersion of the materials. Under the action of the centrifugal force, the materials continue to flow into the gap between the first cylinder 131 and the second cylinder 132 via the second flow-out channel 1321*c* and collide with the wall surfaces of the first shearing teeth 1311*b*. In addition, the materials will be subjected to a large shearing force in the gap, so that the crushing and dispersion of the materials can be accelerated, further improving the material dispersion efficiency. The materials dispersed will flow back to the accommodating cavity 111 via the first flow-out channel 1311*c* and can flow back to the dispersing part 13 to be dispersed again, so that the material dispersion efficiency is further improved.

In some embodiments of this application, width of the first flow-out channel 1311*c* is smaller than or equal to width of the second flow-out channel 1321*c*.

In the foregoing embodiments, with the width of the first flow-out channel 1311*c* being smaller than or equal to the width of the second flow-out channel 1321*c*, the materials can flow into the gap between the first cylinder 131 and the second cylinder 132 at a high speed so as to be sheared. In addition, the sheared materials can enter the narrower first flow-out channel 1311*c* to be sheared again, thereby further improving the material dispersion efficiency.

In some embodiments of this application, the first flow-out channel 1311*c* has a width of 2 mm to 5 mm, and the second flow-out channel 1321*c* has a width of 3 mm to 8 mm.

In the foregoing embodiments, the width settings of the first flow-out channel 1311*c* and the second flow-out channel 1321*c* can not only increase the amount of materials flowing into the gap between the first cylinder 131 and the second cylinder 132, but also improve the material dispersion efficiency.

In some embodiments of this application, the first flow-out channel 1311*c* is inclined with respect to a radial direction of the first cylinder 131. The second flow-out channel 1321*c* is inclined with respect to a radial direction of the second cylinder 132.

In the foregoing embodiments, the first flow-out channel 1311*c* and the second flow-out channel 1321*c* are inclined, so that the materials passing through the first flow-out channel 1311*c* and the second flow-out channel 1321*c* will have friction and collide with each other in the channels and will have friction and collide with the wall surfaces of the channels as well. In this way, crushing and dispersion of the materials can be accelerated, increasing the material dispersion efficiency.

Refer to FIG. 4. In some embodiments of this application, a cross section of the first shearing tooth 1311*b* is an inclined rectangle. A cross section of the second shearing tooth 1321*b* is an inclined rectangle. With the inclination of the rectangles, the materials can be guided to rapidly pass through the flow-out channels, thereby shortening the dispersion time.

In some embodiments of this application, an inclination angle of the first shearing tooth 1311*b* is 30° to 45°. An inclination angle of the second shearing tooth 1321*b* is 30° to 60°.

In the foregoing embodiments, the angle settings of the first shearing teeth 1311*b* and the second shearing teeth 1321*b* accelerate flow of the materials into the flow-out channels, and make the first shearing teeth 1311*b* and the second shearing teeth 1321*b* have sharp ends. Thus, the materials can be crushed efficiently, improving the material dispersion efficiency.

For example, the cross section of the first shearing tooth 1311*b* and the cross section of the second shearing tooth 1321*b* may be parallelograms, or rhombuses.

In some embodiments of this application, the cross sections of the first shearing tooth 1311*b* and the second shearing tooth 1321*b* are inclined in opposite directions. In this way, a possibility of collision between the wall surface of the first cylinder 131 and the materials flowing out of the second cylinder 132 can be increased, thus helping the crushing and dispersion of the materials.

Figure 5:
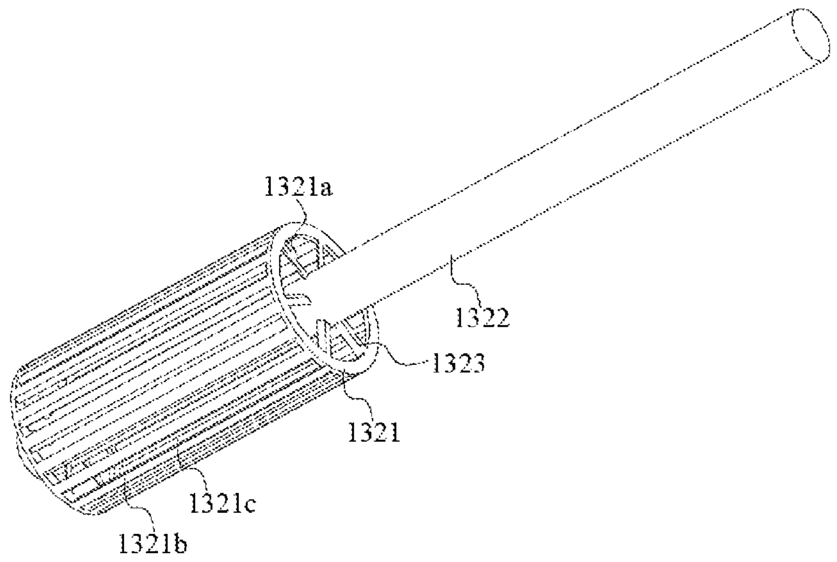
FIG. 5 is a schematic structural diagram of a second cylinder in a dispersing part according to some embodiments of this application.

Refer to FIG. 5. In some embodiments of this application, the second cylinder 132 includes a second cylinder body 1321, a transmission member 1322, and a plurality of support members 1323. The second cylinder body 1321 has a second cavity 1321*a*. The transmission member 1322 is disposed in the second cavity 1321*a* and connected to the driving part 14. The support members 1323 are connected between the second cylinder body 1321 and the transmission member 1322 such that the driving part 14 drives the transmission member 1322 to drive the second cylinder body 1321 to rotate. A feeding channel of the second cylinder body 1321 is formed between adjacent two of the support members 1323, and the feeding channel is in communication with the second cavity 1321*a*.

For example, the transmission member 1322 is located in the center of the second cylinder body 1321, one end of the support member 1323 is connected to an end portion of the second cylinder body 1321, and the other end of the support member 1323 is connected to the transmission member 1322. When the driving part 14 drives the transmission member 1322 to drive the second cylinder body 1321 to rotate, negative pressure is produced inside the second cavity 1321*a* such that the materials in the accommodating cavity 111 can be sucked into the second cavity 1321*a* via the feeding channel.

In the foregoing embodiments, at least one end portion of the second cylinder body 1321 is connected to the support members 1323, and the support members 1323 can provide fixed connection and support, thus facilitating stable rotation of the second cylinder body 1321. In addition, the feeding channel formed between the adjacent support members 1323 can enhance flow of the materials in an axial direction of the second cylinder 1321 so as to increase a possibility of being sheared, thereby shortening the material dispersion time and improving the material dispersion efficiency.

In some embodiments of this application, the support member 1323 includes a guide surface, and the guide surface is inclined toward the second cavity 1321*a*. The guide surface can accelerate flow of the materials into the second cavity 1321*a* and enhance the flow of the materials along the axial direction, thereby increasing the possibility of the materials being sheared, further shortening the material dispersion time and improving the material dispersion efficiency.

In some embodiments of this application, an inclination angle of the guide surface is 30° to 60°.

In the foregoing embodiments, the inclination angle setting of the guide surface allows the materials to be guided to flow rapidly into the second cavity and flow at a high speed along the axial direction of the second cylinder, so that the materials collide with each other and flow out at a high speed, thus enhancing the crushing and dispersion of the materials.

Figure 6:
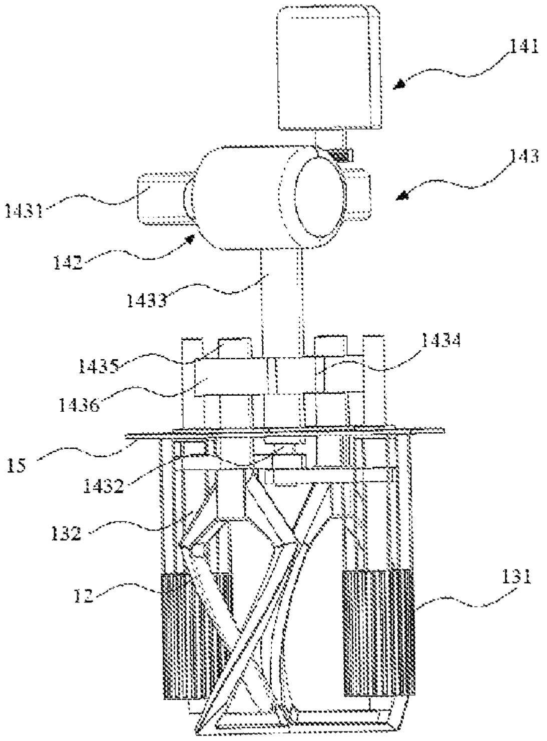
FIG. 6 is a schematic structural diagram of the mixing and dispersing apparatus in FIG. 1 with a tank body hidden.

Refer to FIG. 6. In some embodiments of this application, the driving part 1414 includes a first traction source 141, a second traction source 142, and a planetary gearbox 143. The first traction source 141 is configured to provide traction for driving the second cylinder 132 to rotate. The second traction source 142 is configured to provide traction for driving the stirring part 12. An input end of the planetary gearbox 143 is connected to both the first traction source 141 and the second traction source 142, and an output end of the planetary gearbox 143 is connected to both the dispersing part 13 and the stirring part 12. The first traction source 141 can provide traction for driving the second cylinder 132 to rotate at a high speed, such that the materials flowing into the dispersing part 13 are sheared, improving the material dispersion efficiency. The second traction source 142 drives, via the planetary gearbox 143, the stirring part 12 to rotate, and the stirring part 12 can spin while revolving, so that the materials are able to flow along both the axial direction and the circumferential direction, shortening the material mixing time.

The first traction source 141 and the second traction source 142 are not specifically limited in the embodiments of this application, and they may be traction apparatuses commonly known in the art, for example, motors.

The planetary gearbox 143 is not specifically limited in the embodiments of this application, and may be a speed reduction apparatus commonly known in the art. For example, the planetary gearbox 143 includes a speed reducer 1431, a center shaft 1432, a sun shaft 1433, a sun gear 1434, a planet shaft 1435, and a planet gear 1436. An input end of the speed reducer 1431 is connected to both the first traction source 141 and the second traction source 142, and an output end of the speed reducer 1431 is connected to the center shaft 1432 and the sun shaft 1433. The center shaft 1432 is located inside the sun shaft 1433 and is connected to the second cylinder 132 via the transmission member 1322. The sun gear 1434 is connected to the sun shaft 1433 and is engaged with the planet gear 1436. The planet gear 1436 is connected to the planet shaft 1435, and the planet shaft 1435 is connected to the stirring part 12.

Figure 7:
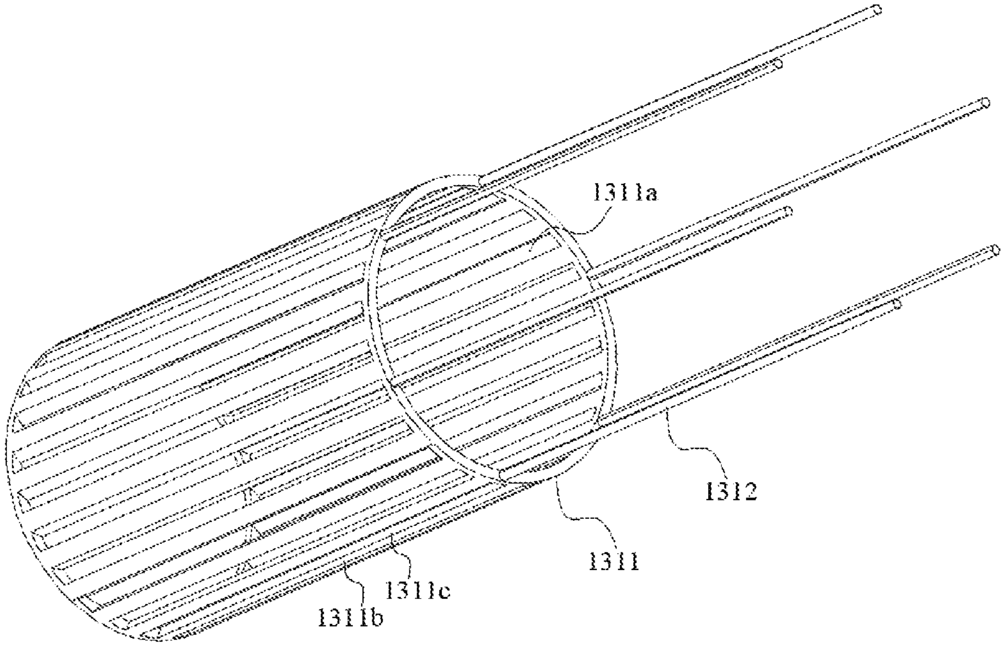
FIG. 7 is a structural schematic diagram of a first cylinder in a dispersing part according to some embodiments of this application.

Refer to FIG. 6 and FIG. 7. In some embodiments of this application, the mixing and dispersing apparatus 10 further includes a turnplate 15, where the turnplate 15 is disposed in the tank body 11 and in transmission connection with the output end of the planetary gearbox 143. The first cylinder 131 includes a first cylinder body 1311 and a connecting shaft 1312 connected to an end portion of the first cylinder body 1311. The first cylinder body 1311 has a first cavity 1311*a*, and the connecting shaft 1312 is also connected to the output end of the planetary gearbox 143, meaning the connecting shaft 1312 is connected to the planet shaft 1435. The second traction source 142 drives the first cylinder body 1311 to rotate, enhancing the collision between the materials and the first cylinder body 1311, thereby accelerating the crushing and dispersion of the materials. Thus, the material dispersion time is further shortened, and the material dispersion efficiency is improved.

In some embodiments of this application, the mixing and dispersing apparatus 10 includes a tank body 11, a stirring part 12, a dispersing part 13, and a driving part 14. The tank body 11 has an accommodating cavity 111 configured to accommodate materials. The stirring part 12 is disposed in the accommodating cavity 111 and configured to mix the materials in the accommodating cavity 111. The dispersing part 13 is disposed in the accommodating cavity 111 and includes a first cylinder 131 and a second cylinder 132. The first cylinder 131 has a first cavity 1311*a* in communication with the accommodating cavity 111, the second cylinder 132 is located in the first cavity 1311*a*, the second cylinder 132 has a second cavity 1321*a* in communication with the accommodating cavity 111, and an inner radius of the first cylinder 131 is 10 mm to 15 mm larger than an outer radius of the second cylinder 132. While driving the stirring part 12 to rotate, the driving part 14 can also drive the second cylinder 132 to rotate in the first cavity 1311*a* with respect to the first cylinder 131, such that the materials mixed in the accommodating cavity 111 are subjected to a large shearing force in the gap between the first cylinder 131 and the second cylinder 132, accelerating the crushing and dispersion of the materials, thus shortening the material dispersion time and improving the material dispersion efficiency.

Although this application has been described with reference to preferred embodiments, various modifications to this application and replacements of the parts herein with equivalents can be made without departing from the scope of this application. In particular, as long as there is no structural conflict, the various technical features mentioned in the embodiments can be combined in any manners. This application is not limited to the specific embodiments disclosed herein but includes all embodiments falling within the scope of the claims.

What is claimed is:

1. A mixing and dispersing apparatus, comprising:

a cylindrical tank body, having an accommodating cavity configured to accommodate materials;

two or more dispersing parts, arranged in the accommodating cavity, wherein each dispersing part comprises a first cylinder and a second cylinder, the first cylinder has a first cavity in communication with the accommodating cavity via a plurality of first flow-out channels, the second cylinder is located in the first cavity, and the second cylinder has a second cavity in communication with the accommodating cavity via a plurality of second flow-out channels;

a stirring part, arranged in the accommodating cavity, wherein the stirring part comprises a first stirring paddle and a second stirring paddle that orbit a central axis of the accommodation cavity, the dispersing parts are arranged off the central axis of the accommodation cavity, and the stirring part is outside of the first cylinders; and a driving part, connected to the stirring part and the dispersing parts, respectively;

wherein the driving part is configured to rotate the first stirring paddle and the second stirring paddle around the central axis of the accommodation cavity to mix the materials in the accommodating cavity, and wherein the driving part is also configured to rotate the second cylinder of each dispersing part with respect to the first cylinder of the dispersing part, such that the materials in the accommodating cavity flow into the second cavity and flow out after being dispersed in the dispersing part.

2. The mixing and dispersing apparatus according to claim 1, wherein an inner radius of the first cylinder is 10 mm to 15 mm larger than an outer radius of the second cylinder.

3. The mixing and dispersing apparatus according to claim 1, wherein a plurality of first shearing teeth are spaced apart along a circumferential direction on a side wall of the first cylinder, a first flow-out channel is formed between adjacent two of the first shearing teeth, and the first flow-out channel is located between and in communication with the first cavity and the accommodating cavity; and a plurality of second shearing teeth are spaced apart along a circumferential direction on a side wall of the second cylinder, a second flow-out channel is formed between adjacent two of the second shearing teeth, and the second flow-out channel is located between and in communication with the first cavity and the second cavity.

4. The mixing and dispersing apparatus according to claim 3, wherein width of the first flow-out channel is smaller than or equal to width of the second flow-out channel.

5. The mixing and dispersing apparatus according to claim 4, wherein the width of the first flow-out channel is 2 mm to 5 mm, and the width of the second flow-out channel is 3 mm to 8 mm.

6. The mixing and dispersing apparatus according to claim 3, wherein the first flow-out channel is inclined with respect to a radial direction of the first cylinder; and the second flow-out channel is inclined with respect to a radial direction of the second cylinder.

7. The mixing and dispersing apparatus according to claim 3, wherein a cross section of the first shearing tooth is an inclined rectangle; and a cross section of the second shearing tooth is an inclined rectangle.

8. The mixing and dispersing apparatus according to claim 7, wherein an inclination angle of the first shearing tooth is 30° to 45°; and an inclination angle of the second shearing tooth is 30° to 60°.

9. The mixing and dispersing apparatus according to claim 8, wherein the cross section of the first shearing tooth and the cross section of the second shearing tooth are inclined in opposite directions.

10. The mixing and dispersing apparatus according to claim 1, wherein the second cylinder comprises:

a second cylinder body, having the second cavity;

a transmission member, disposed in the second cavity and connected to the driving part; and a plurality of support members, connected between the second cylinder body and the transmission member such that the driving part drives the transmission member to drive the second cylinder body to rotate, wherein a feeding channel of the second cylinder body is formed between adjacent two of the support members, and the feeding channel is in communication with the second cavity.

11. The mixing and dispersing apparatus according to claim 10, wherein the support member comprises a guide surface that is inclined toward the second cavity.

12. The mixing and dispersing apparatus according to claim 11, wherein an inclination angle of the guide surface is 30° to 60°.

13. The mixing and dispersing apparatus according to claim 1, wherein the driving part comprises:

a first traction source, configured to provide traction for driving the second cylinder to rotate;

a second traction source, configured to provide traction for driving the stirring part to rotate; and a planetary gearbox, wherein an input end of the planetary gearbox is connected to both the first traction source and the second traction source, and an output end of the planetary gearbox is connected to both the dispersing part and the stirring part.

14. The mixing and dispersing apparatus according to claim 13, wherein the mixing and dispersing apparatus further comprises a turnplate, and the turnplate is disposed in the tank body and is in transmission connection with the output end of the planetary gearbox; and the first cylinder comprises a first cylinder body and a connecting shaft that is connected to an end portion of the first cylinder body, wherein the connecting shaft is also connected to the turnplate.

* * * * *